METHOD OF AND APPARATUS FOR TRANSPORTING CONCRETE
Original Filed May 18, 1961 3 Sheets-Sheet 1
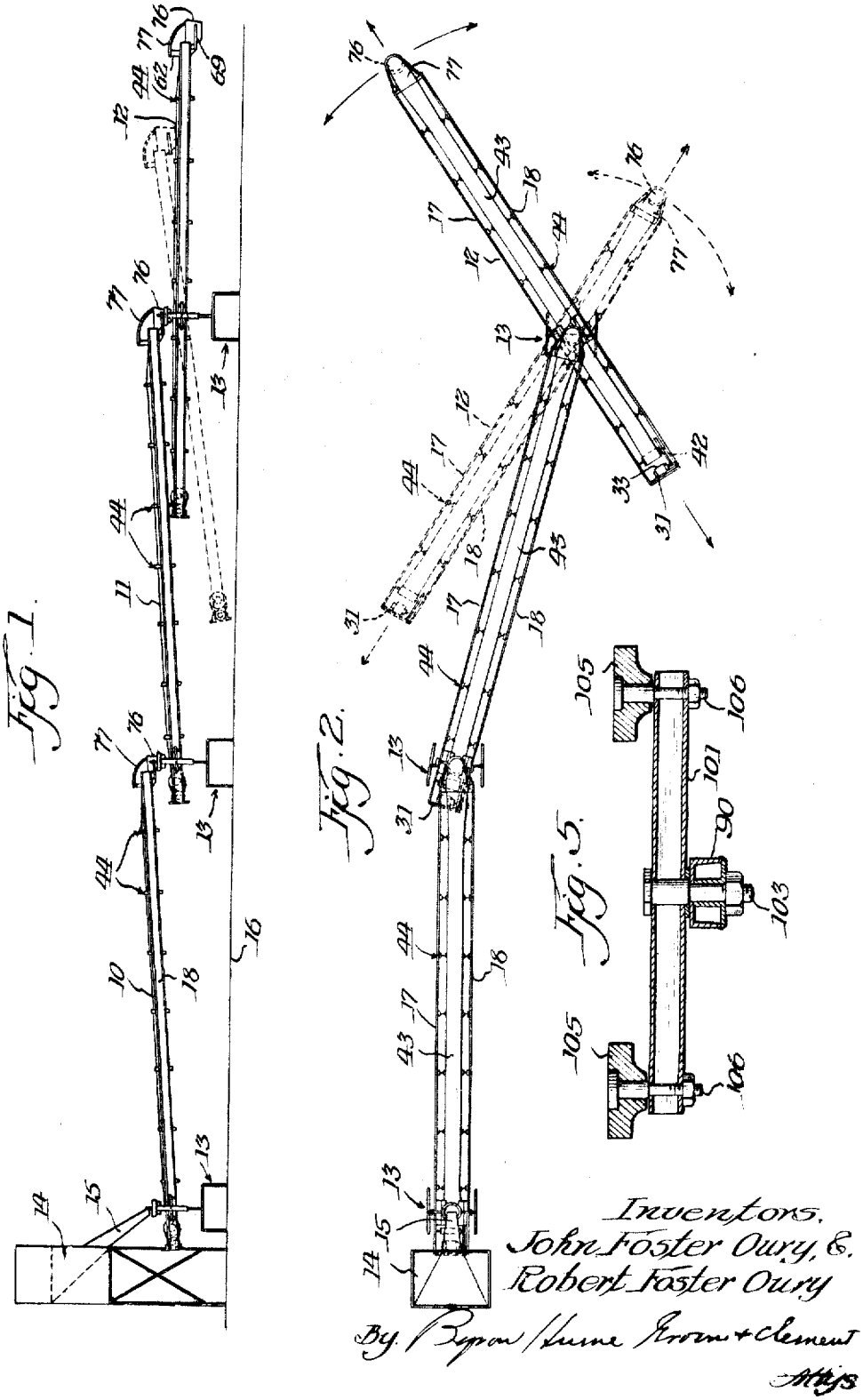

Nov. 21, 1967 J. F. OURY ETAL Re. 26,298
METHOD OF AND APPARATUS FOR TRANSPORTING CONCRETE
Original Filed May 18, 1961
3 Sheets-Sheet 2
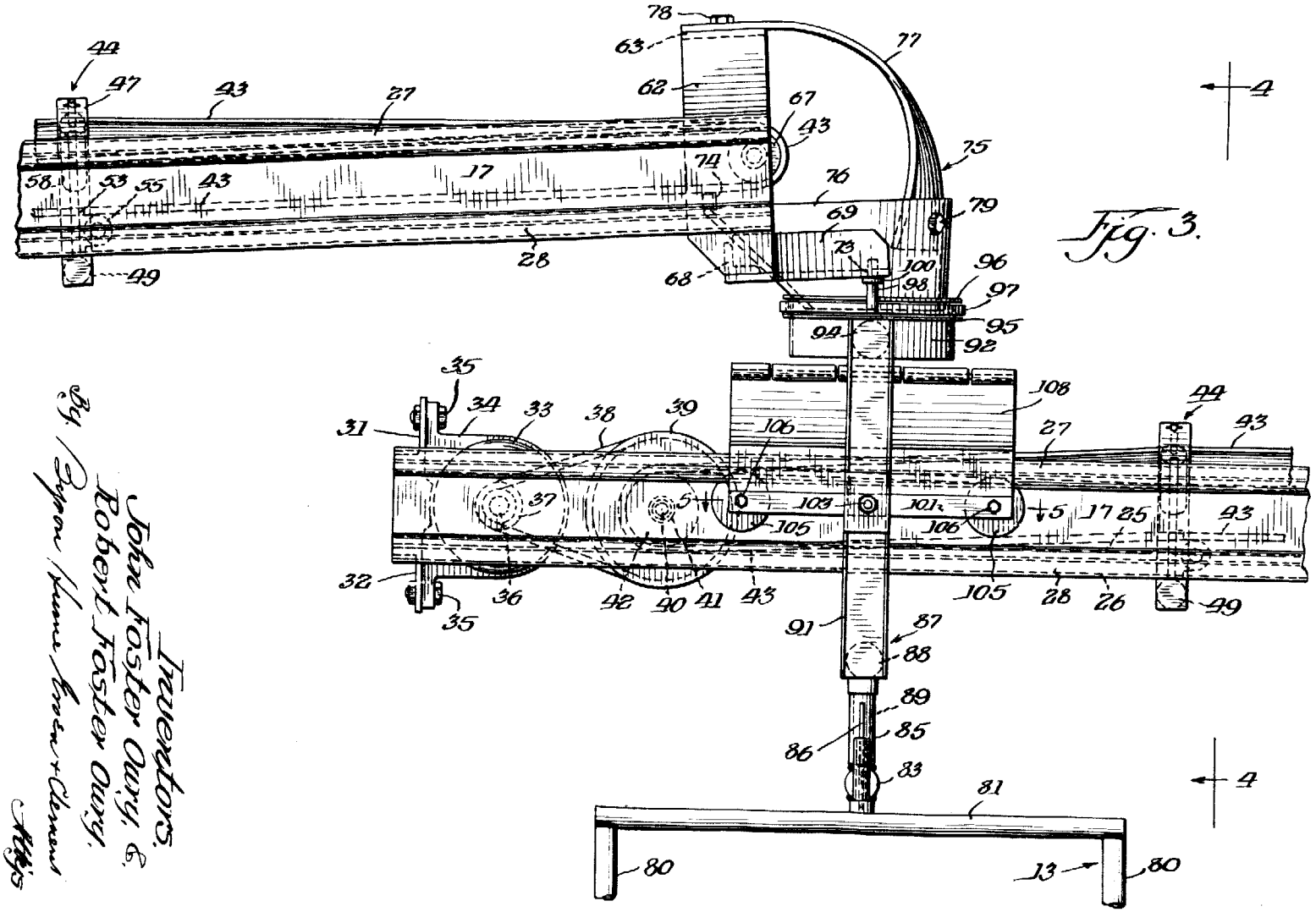
Inventors.
John Foster Oury, &
Robert Foster Oury,
By Bryon Hume Green + Clements
Atty's Nov. 21, 1967 J. F. OURY ETAL Re. 26,298

METHOD OF AND APPARATUS FOR TRANSPORTING CONCRETE

Original Filed May 18, 1961

3 Sheets-Sheet 3

Inventors.
John Foster Oury, 6.
Robert Foster Oury.
By Byron Hume Cross & Clement
Attys.

United States Patent Office

Re. 26,298
Reissued Nov. 21, 1967

26,298

METHOD OF AND APPARATUS FOR TRANSPORTING CONCRETE

John F. Oury, deceased, late of Wheaton, Ill., by Alice M. Oury, executor, Wheaton, Ill. (Indian Knoll Road, Rte. 1, Box 135, West Chicago, Ill. 60185), and Robert F. Oury, Army Trail, Wayne, Ill. 60184

Original No. 3,151,732, dated Oct. 6, 1964, Ser. No. 111,427, May 18, 1961. Application for reissue Aug. 31, 1966, Ser. No. 582,183

11 Claims. (Cl. 198—92)

Matter enclosed in heavy brackets [ ] appears in the original patent but forms no part of this reissue specification; matter printed in italics indicates the additions made by reissue.

[Our] *This* invention relates to a method of and apparatus for distributing concrete mix and has particular reference to a method of conveying concrete from a selected receiving point and conveying it to its point of final use, either for the making of a slab on the ground, but particularly for use in the making of floors in buildings which may have either steel or concrete beam superstructures or may be used in the casting of a concrete building in unit form consisting of vertical risers and horizontal cross floor beams with floors integrally cast therewith.

A further object is the one of a plurality of independently supported and operated conveyors made of sections and placed in end-to-end relation with each other with each of the conveyors being pivotally supported so the ends of the conveyors are capable of movement in a vertical direction and also are rotatable in a horizontal plane through a complete circle and also the conveyors may be positioned on the supporting mechanism in such manner that the concrete is discharged in a circle equal to the full length of one of the conveyors or in circles of lesser size down to as small as six feet in diameter.

Another and further object of [our] *this* invention is the provision of a system of conveying concrete at a fairly rapid speed in mass formation in a solid stream from the point of receipt to the point of delivery so that the concrete is deposited at its point of use for final spreading and tamping in as prime a condition as may be possible to provide so the separation of the various component parts of the concrete, particularly the coarser aggregate, is prevented; with the mix being held in close relationship throughout the entire conveying period and its final deposit so that the coatings of the aggregate material is retained as uniformly as possible and is not allowed to separate during such conveying process.

Another and further object of [our] *this* invention is the provision of conveyors in units of prescribed length and minimum weight so that they can be easily set up, easily handled, and manipulated into position with the conveyors being supported upon a movable frame and normally comprises a plurality of independently operated conveyors which are supported at their tail or receiving ends upon suitable movable end adjustable frames and at their head or discharge ends, upon the movable frame which supports the next succeeding conveyor, these conveyors being made of a light material such as aluminum and weighing approximately 500 pounds so that they can be easily handled and positioned by workmen for the handling and discharging of the concrete.

Another and further object of [our] *this* invention is the use of a plurality of conveyors in such manner that the concrete mix may be conveyed in a straight line, or the conveyors may be arranged in angular positions with each other thereby passing columns or rises or other obstructions, and are usually plural so that the discharge end of each conveyor except the final one is elevated above the receiving end of each conveyor, thus tending to keep the stream of concrete closely packed together.

Another and further object of [my] *this* invention is the provision of a series of power operating conveying units which may be so positioned upon a prefabricated base structure or upon forms that the concrete mix can be delivered to them and deposited very easily and quickly by power, resulting in much less manual effort and much more speed and ease of deposit than what has been possible heretofore.

It will be understood that in the making of concrete buildings and particularly in the casting or molding of floor structures in buildings at points elevated above the ground, it has been the practice to supply concrete to skips which carry the concrete mix upward to a predetermined point where it is usually discharged into power or manually actuated buggies which are operated over runway systems mounted on wooden horses to the point of deposit. The conveyors used in the system herein described can be set up for a fraction of the cost and in much less time than it takes to set up the runways, and once set up, are operable at a production rate more than double that of the usual buggy and runway systems and with about one-half the labor force necessary for the operation of the buggies. In addition, when concrete is handled in the buggies, it means that each time the buggy is filled, the supply chute must be shut off, the buggy removed and replaced with another buggy, which means that production continuity is impaired.

Another and further object of [our] *this* invention is the provision of the series of conveyors and supporting means therefor which can be easily placed in position upon a roof layout in various angular positions with respect to each section, which is so mounted that one conveyor can be placed at right angles to another conveyor with the first conveyor being supported upon the frame and the next succeeding head end of the conveyor being supported upon the support mechanism at the tail end of the last succeeding conveyor so that the conveyors are not easily moved out of their working positions and yet one conveyor can be very easily disconnected from another and taken out of the line and removed when it may be desirable to do so.

Another and further object of [our] *this* invention is the provision of the support mechanism for the conveyors and in which the last conveyor on the line of conveyors which is used for initial floor laying operations, can be cut off from the line at any particular time and removed out of the way of the floor already prepared and the operation proceeded with the next conveyor, each conveyor being mounted upon the support member in such manner that it can be moved on the support frame so that the entire length of the conveyor can be used for the transporting of concrete, or only a very small portion of such conveyor used, depending upon the distance that the concrete is to be moved in the laying operations.

Another and further object of [our] *this* invention is the provision of a conveyor system in which the conveyors themselves are fairly light in weight and can be easily handled by workmen holding the discharge end of the conveyor and moving it up or down and in or out within the stand or in a circle so as to deposit the concrete in the most desirable location for the smoothing out, filling, and tamping operations necessary for the final laying of the concrete.

Another and further object of [my] *this* invention is the provision of a system of conveyors, each conveyor being approximately 30 feet in length and operating at a speed of travel of about 600 feet per minute so that concrete is delivered very rapidly and held intact in substantially a solid stream with the conveyors being light enough so that they can be manually handled by the workmen or ordinary support horses can be used to support the discharge end of the conveyor, if desired.

These and other objects of [our] *this* invention will be more fully and better understood by reference to the accompanying sheets of drawings and in which:

FIGURE 1 is a side elevation of a plurality of conveyors in various working positions;

FIGURE 2 is a top plan view of the conveyors shown in FIGURE 1;

FIGURE 3 is a side view showing the head end of one conveyor supported over the tail end of the next succeeding conveyor and a portion of the frame supporting both conveyors;

FIGURE 5 is a sectional view showing the support arms for the conveyors mounted upon one side of the supporting channels.

Figure 4:
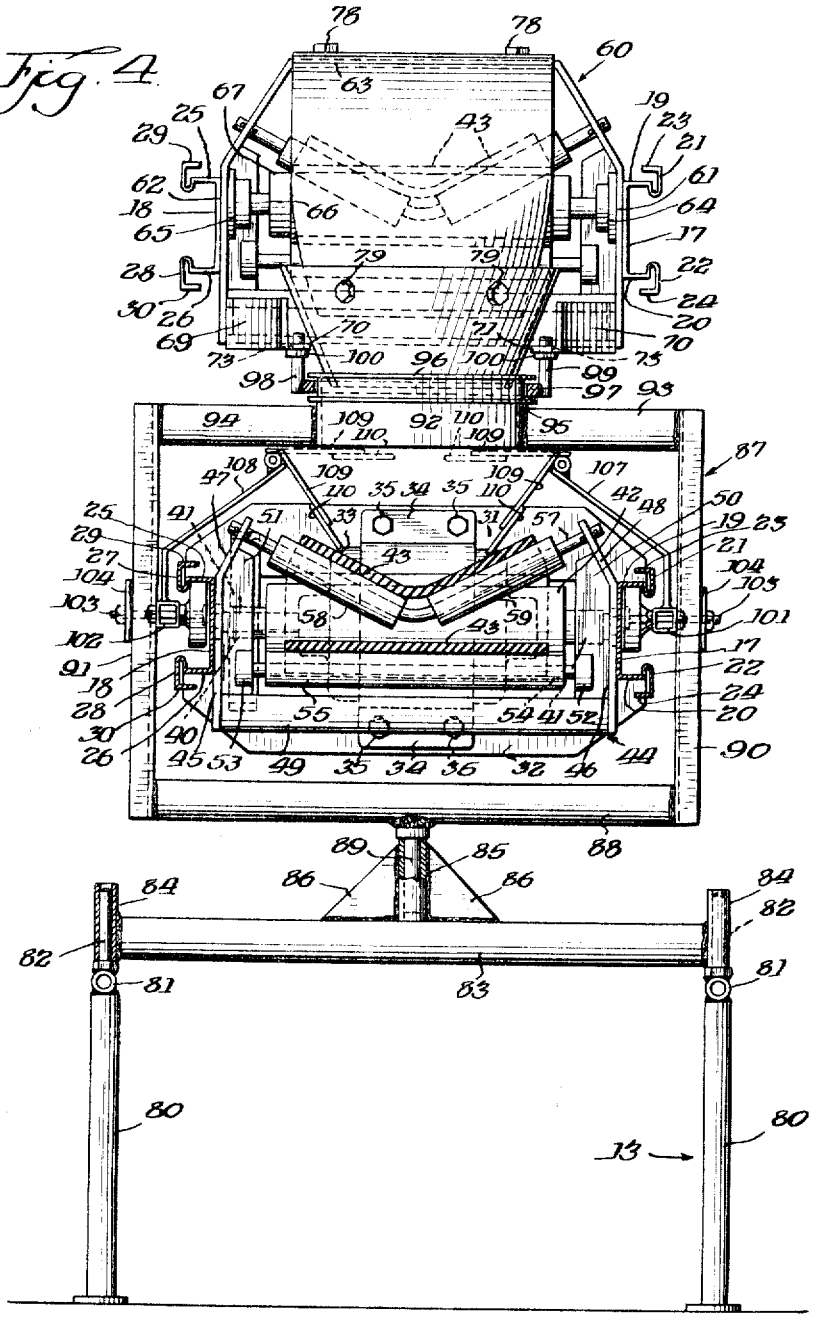
FIGURE 4 is an end view on line 4—4 of FIGURE 3, showing the parts in a slightly upwardly inclined position; *and*

Referring now specifically to the drawings and in which like reference characters refer to like parts throughout, a series of conveyors 10, 11, and 12 are shown and supported by stands 13, 13 in spaced relation with each other and at various relative positions with respect to the conveyors 10, 11, and 12 with a hopper mechanism 14 at one side thereof having a discharge spout 15 provided through which concrete is discharged onto the conveyor 10 with a support floor 16 being provided which is formed of the support members, form and the like for receiving the concrete mix for the formation of the floor. The support frames for the conveyors 10 and 11 are shown at the tail or receiving end of each conveyor, and in position to support the head or discharge ends of the next rearward conveyor with the discharge end of the conveyors 10 and 11 elevated above the tail or receiving ends of the conveyors. The conveyor 12 is shown with the supporting stand 13 intermediate the ends of the conveyor, the conveyor 12 is substantially horizontal with its stand 13 supporting the discharge end of the preceding conveyor 11.

The conveyors are identical in form and comprise a pair of side channels 17 and 18, the said channel 17 having the usual central web portion, an upper outwardly turned flange 19, and a lower, outwardly turned flange 20 thereon with ribs 21 and 22 being formed along the outer edges of each of the flanges 19 and 20 which are turned upon themselves toward each other adjacent the edges of the flange 20 to form retainers for purposes hereinafter described, and have inwardly turned edge portions 23 and 24 which places the edges inward out of the way of workmen handling the conveyor.

The channel section 18 has an upper flange 25 and a lower flange 26 thereon, each of these flanges having outwardly extending retaining ribs 27 and 28 thereon with inwardly turned edge portions 29 and 30, this arrangement being the same as is the channel section 17, except turned in a reverse direction.

The channel sections 17 and 18 are held together at their rear ends by an upper angle 31 which is welded at each of its ends to the flanges 19 and 25, and a lower angle 32 which is also welded at each of its ends to the outer faces of the flanges 20 and 26, which angles 31 and 32 span the space between the two channel sections 17 and 18 and serve to hold these channel sections together at their rear ends.

An electric motor 33 is mounted in a motor frame 34 which is secured to the angles 31 and 32 by bolts 35, 35 which motor has a shaft 36 upon the outer end of which a belt wheel 37 is mounted over which a belt 38 operates, which in turn is connected with a belt wheel 39 upon the outer end of a roller shaft 40, operating in bearings 41, 41 at each of its sides, which bearings 41, 41 are mounted in the side channel sections 17 and 18, and has a traction roller 42 secured thereon around which an endless conveyor belt 43 operates.

A series of frames 44, 44 are provided for each of the conveyors in spaced relation with each other throughout the length of the conveyors for securing the side channels 17 and 18 in position and for supporting other operating parts of the conveyors, one of which such frames 44 is shown in detail in FIGURE 4 of the drawings. Each frame 44 consists of a pair of cheek plates 45 and 46 bolted to the inner faces of the side channels 17 and 18 which have extensions 47 and 48 at their upper ends and are connected together at their lower ends by a tubular cross brace 49 which is welded at each of its ends to the lower ends of the cheek plates 45 and 46 and spans the space therebetween. Gussets 50 and 51 are welded to the cheek plates 47 and 48 and have bearings 52 and 53 secured thereto within which a roller shaft 54 is mounted at each of its ends with an idler roller 55 fixedly mounted thereon which supports the endless conveyor belt 43. A shaft 57 bent at its middle so that angularly disposed portions are provided, is removably mounted on one of its ends in a slot formed in the end of the extension 47 on the cheek plate 45, with its other end secured in a hole formed in the end of the extension 48 of the cheek plate 46 and has rollers 58 and 59 mounted on the angular portions of the rod 57 which rotate freely on the said rod 57 and support the upper portion of the endless belt 43 in V-form to carry the concrete mix towards the discharge end of each of the conveyors. The several units designated as 44, 44 [which] are provided throughout the length of each conveyor. *The conveyors* preferably should be about 30 feet in length for quick and easy handling[,] and are composed almost entirely of a light weight material such as aluminum and weigh approximately five hundred pounds so they can be easily carried and handled by workmen.

The head or discharge end of the conveyor has an inverted V-shaped bail 60 consisting of leg portions 61 and 62, the lower portions of which are bolted to the side channels 17 and 18 on their inner faces and have their upper portions inwardly turned to form a top portion 63 the upper portions of the legs and the top portion 63 spanning the space over the side channels 17 and 18. Bearings 64 and 65 are welded to the inner faces of the lower leg portions 61 and 62 and have a shaft 66 mounted thereon at each of its ends upon which a roller 67 is mounted and around which the endless conveyor belt 38 operates at the head or discharge end of the conveyor. The roller 67 is fixed upon the shaft 66 and is approximately the same diameter as is the traction roller 42 at the tail or receiving end of the conveyor.

An angular cross brace 68 is welded at each of its ends to the inner faces of each of the leg portions 61 and 62 of the bail 60 and spans the space between the said leg portions and which serves to hold the side channels 17 and 18 together. A pair of angles 69 and 70 are welded at their inner ends to the legs 61 and 62 and to the under side of the cross brace 68 at its outer ends and which project outwardly from the end of the conveyor, and converge inward toward each other at their inner ends and have holes 73, 73 in their flanges 71 and 72 for purposes hereinafter described. A scraper blade 74 is provided which is secured to the inside face of the legs 61 and 62 at each of its ends and engages the under surface of the conveyor belt 43 after it passes around the roller 67 to receive particles of cement or the like which might have adhered to the surface of the belt as it passes over the roller 67.

A discharge boot designated as a whole as 75 is provided and which consists of a funnel shaped member 76 open at each of its ends and of greater diameter at its top than at its discharge end and has its discharge end extending below the angles 69 and 70 and is supported at one of its sides by the cross brace 68 and at its opposite sides by a hood 77 which is curved in both a longitudinal direction and also transversely and which is secured to the top portion 63 of the bail 60 at its upper end and by means of bolts 78, 78. The hood 77 is fitted inside the funnel 76 which is secured to the hood by bolts 79, 79, the hood 77 and funnel shaped member 76 being made of very heavy flexible material such as belting or the like and forms an effective member for receiving the concrete mix discharged from the belt and impinged against the hood 77 and directed into and through the funnel where it is discharged into the belt of the next succeeding conveyor or to its final position to be spread and tamped in the usual manner of laying concrete for floor construction.

The various conveyors are mounted upon the stands 13, 13 illustrated in detail in FIGURES 3, 4 and 5 of the drawings. Each stand consists of two inverted U-shaped side portions, each side portion consisting of legs 80, 80 and top connecting members 81, 81. The top connecting members 81, 81 at their centers have studs 82, 82 extending upward therefrom upon which a cross bar 83 is mounted having sockets 84, 84 at each of its ends which are fitted over the studs 82, 82 which permits each of the U-shaped side supporting members of the stand to rotate in a horizontal direction so that in placing the stand in position on the forms for pouring concrete and the like, the side portions can be rotated to positions where firm footing is provided for each of the legs 80, 80.

The cross bar 83 has a socket 85 mounted thereon and supported by triangular shaped members 86, 86 for the purpose of receiving a conveyor supporting frame mounted above the base frame and designated as a whole as 87. The frame 87 consists of a cross member 88 which has a downwardly extending pintle 89 secured thereto and has side members 90 and 91 at each of its sides and a ring member 92 centrally located at the top of the frame member 87, which member 92 is welded to cross members 93 and 94 at each of their inner ends and which members 93 and 94 are welded at their outer ends to the upper ends of the side members 90 and 91, with the ring member 92 having a lower flange 95 extending thereabout and a circular flange 96 at its upper edge, both flanges 95 and 96 extending outwardly a short distance from the wall of the ring member 92 and spaced from each other whereby a channel is formed therebetween with a rotating ring 97 mounted on the said channel. The ring 97 has studs 98 and 99 welded thereto and extending upward therefrom, which studs 98 and 99 have ring shaped stops 100, 100 thereon with the studs adapted to fit into the holes 73, 73 formed in the angles 69 and 70 and which serve to support and to hold the head or discharge end of the conveyor in position over the tail of the next succeeding conveyor in the operation of the device with the frame 87 being able to move in a full circle on the pintle 89 at its lower side and the movement of the circular flange 96 in a complete circle with the ring member 97 remaining stationary so that the discharge end of the conveyor does not move by such turning operation while the next succeeding conveyor supported by the frame 87 can be moved in a complete circle or in any part of such a circle which may be desired.

A pair of arms 101 and 102 are pivotally secured to the side members 90 and 91 of the frame 87 by means of bolts 103, 103 which bolts have plates 104, 104 on the outer ends thereof which engage the outer faces of side members 90 and 91. Each of the arms 101 and 102 has rollers 105, 105 mounted at the ends thereof upon bolts 106, 106, the heads of which bolts are countersunk in the rollers 105, 105 and have enlarged portions thereon which act as axles upon which the rollers 105, 105 rotate and shoulders which limit the longitudinal movement of the bolts 106, 106 and permit full rotation of the rollers 105, 105. The rollers 105, 105 engage the under side of the upper flanges 19 and 25 on the side channels 17 and 18 and support the conveyors thereon. The ribs 21 and 27 in the upper flanges 19 and 25 engage the outer side of the rollers 103, 103 and prevent sidewise movement of the conveyors when in normal position. The ribs 22 and 28 also perform the same function if the conveyor is elevated too high. Each of the conveyors is movable longitudinally within the frame 87 for the entire length of the conveyor and also permitting an up and down titling movement of the conveyor upon the bolts 103, 103 as pivot points. Each conveyor can be inserted into, and removed from, the frame 87 upon the two sets of rollers 105, 105 by projecting the discharge end of the conveyor through the frame 87 to any point desired and the frame can be moved to any position desired in the actual operation of the device, particularly with respect to the final conveyor in the chain of conveyors and from which the concrete mix is ultimately discharged.

A pair of brackets 107 and 108 are provided which are mounted upon the arms 101 and 102 on each side of the frame 87 and extend upward and inward therefrom and have hinged blades 109, 109 secured thereto, which blades have flexible end members 110, 110 thereon which extend down into engagement with the belt 38 and perform the function of preventing the spilling of the concrete mix over the sides of the belt and guiding the mixture onto the belt 38 as it is received into the tail end of the conveyor from the next succeeding rear conveyor or from the spout 15 in the initial discharge of concrete mix into the first conveyor designated in the drawings as number 10. During the insertion of a conveyor into the frame 87, the blades 109, 109 and end portions 110, 110 can be moved upward out of the path of the conveyor as shown in dotted position in FIGURE 4 of the drawings.

It will be understood that in use the apparatus can be easily dismantled into various units and such units removed and again set up for operation with as many conveyors as desired. [I have] *It has been* found that ten such conveyors may be convenient for use and economically profitable and, of course, strings of any lesser number are possible and feasible. A string of ten thirty-foot conveyors can convey the mix approximately three hundred feet.

Assuming that the apparatus is in position for use, the first conveyor 10 is placed in such position that concrete mix is discharged from a spout 15, or from the discharge end of a transit mixer truck, with the tail or discharge end elevated so the studs 98 and 99 are seated in the holes 73, 73 in the end of the angles 69 and 70 and rest upon the stops 100, 100 on the pins 98 and 99. This arrangement permits the free rotation of the frame 87 without disturbing the position of the discharge end of the chute. The discharge end of the next adjacent chute, except the last one, is mounted on the supporting frame of the next adjacent chute to it and so on with all of the chutes except the last one. The discharge end of the last chute is held by workmen, or may be placed on a stand and moved as needed to properly place the concrete mix in position to be spread and tamped into final position.

In setting up the combination of chutes for operation the leg portions of the bottom frame are placed upon the supporting structure forms or the like and can be moved horizontally about the studs 82, 82 to provide satisfactory position upon the forms or building structure, the frame 87 is placed in position in the socket 85 and the discharge end of one of the conveyors projected into the frame 87 upon sets of the rollers 105, 105 in engagement with the top flanges 19 and 25 of the side channels 17 and 18. The conveyor can be moved to any relative position upon these rollers—that is, so that the head end of the conveyor is supported on the frames as shown in FIGURE 1 or the conveyors can be placed in intermediate position as shown with respect to the conveyor 12 located in the stand 13. Preferably, in setting up for such an operation, one of the stands 13 with a conveyor mounted thereon is put into position to receive concrete from the chute 15 and as many succeeding units are added as may be necessary to convey concrete mix from the point of supply to its point of final distribution and laying the concrete mix. [We have] *It has been* found that as many as 10 of these conveyors can be arranged with good advantage to convey the concrete mix for a distance of 300 feet from its point of receipt to its place of discharge. In the initial use the end conveyor 12 may be fully extended and can be moved in a circle having a radius of 30 feet for supplying the concrete to a position where it can be distributed and tamped into position into forms. While in such position the discharge end of the conveyor may be handled by hand or it may be supported by some support stand or the like while delivering the concrete and when one area has been completed, the conveyor is retracted and moved in a smaller circular pattern and the process repeated until the conveyor is retracted so that the discharge end of the chute will travel in a circular path of approximately six feet in diameter. When concrete has been placed back to the next successive conveyor, the end conveyor and stand supporting it is removed and the next succeeding conveyor thereupon becomes the distribution conveyor and this pattern can be repeated until the area from the point of initial supply to the end can be filled and supplied with concrete mix.

As the mix is received over the tail end of the conveyor, the belt is traveling at a somewhat flat position, but begins to assume a V-shaped form in cross section at a point close to its point of receipt where the stream of concrete is carried in this form to the discharge end of the conveyor where it is impinged against the hood through the funnel shaped member and through the ring device onto the side plates 109, 109 and delivered onto the receiving end of the next succeeding conveyor.

[We have] *It has been* found that the fairly high rate of speed in the movement of the conveyor belts can be obtained up to 600 feet per minute or greater, which speed imparts a considerable velocity to the concrete as it is discharged from the end of the conveyor against the boot and at a rate rapidly enough to retain the stream of concrete in substantially unit form as it is transferred from one conveyor to another. The boot, funnel and ring shaped member assist in relaying the mix in stream form and the concrete mix therefore is kept in a compact condition as it is transported through the chutes, this being accomplished by reason of the speed of movement of the conveyor belt. Also, the discharge end of each of the conveyors except the last one, or distributing conveyor, is slightly higher than is the receiving end so that the movement of the concrete is normally up a slight incline. The compact stream-like form is continued as the concrete is discharged through the boots and rings in a solid stream-like form onto the next succeeding belt where the operation is continued to the final discharge of the concrete which, in the case of a conveyor system of approximately 300 feet in length with the belts traveling at the rate of 600 feet per minute means that the concrete is discharged at its point of use in about half a minute, thus maintaining a constant stream in unit form from the point of receipt to the point of discharge and avoids the segregating of the material at any time in its progress into separation of cement, sand and gravel, which segregation is a normal result of conveyors customarily operating at slower speeds of approximately 200 to 400 feet per minute.

After a pouring operation of one floor or one location, the conveyors and stands are dismantled and may be again assembled and set up for use in a new location in a short period of time. The use of the system herein disclosed results in very considerable savings both in the cost of labor and material, and a floor can be laid in much less time than it has been possible to accomplish through the use of either power-actuated or hand operated buggies.

While [we have described more or less precisely] the method employed and the apparatus used therewith *have been described more or less precisely*, [I do not wish to] *it should* be understood *that* [as limiting myself thereto, as I contemplate] changes *are contemplated* in form and the proportion of parts and the substitution of equivalents as circumstances may suggest or render expedient without departing from the spirit or scope of [my] *this* invention.

What is claimed is:

1. Concrete mix handling apparatus comprising in combination, a movable base, a support frame rotatably mounted upon the said base, *a* conveyor frame having longitudinal channels, arms pivotally connected intermediate their ends to said support frame, a pair of support rollers on each of said arms below said conveyor frame channels, said support rollers in each pair spaced outwardly from, and on opposite sides of, the intermediate pivot point of said arms, said conveyor frame channels supported upon said support rollers within the said support frame and movable thereon in a longitudinal direction, an endless belt on said conveyor frame, and a motor mounted upon the said conveyor frame for driving said endless belt.

2. Concrete mix handling apparatus comprising in combination, a movable base, a rotatable support frame rotatably mounted upon the said base, a conveyor frame having longitudinal channel members, pivotally mounted conveyor support arms connected intermediate their ends to the said rotatable support frame, rollers adjacent each of the ends of the said arms on opposite sides of the intermediate pivot below said conveyor frame channel members forming a four point support therefor, said conveyor frame mounted within the said rotatable support frame upon said rollers carried by said arms and movable thereon in a longitudinal direction, an endless belt on said conveyor frame, and a motor mounted upon the said conveyor frame for driving said endless belt.

3. Concrete mix handling apparatus comprising in [comprising in] combination, a movable base, an open support frame rotatably mounted upon the said base, said open support frame comprising top and bottom members and side members connecting said top and bottom members, a conveyor frame having at the sides a pair of longitudinal channel members, a pair of support arms pivotally connected intermediate their ends to said open support frame, rollers adjacent the ends of the said arms and on opposite sides of the intermediate pivot, said channel members comprising inverted U-shaped tracks in which said rollers travel, said conveyor frame mounted within the said open support frame upon said rollers carried by said arms and movable thereon in a longitudinal direction, an endless belt on said conveyor frame, and a motor mounted upon the said conveyor frame for driving said endless belt.

4. Concrete mix handling apparatus comprising in combination a movable base stand, a frame having top and bottom members and side members connecting the top and bottom members rotatably mounted upon the said base, pivotally supported arms mounted intermediately their ends on the side members of the said frame, rollers adjacent each of the ends of the said arms, a conveyor frame, an inverted channel section secured to each side of the said conveyor frame forming tracks for the said rollers, said rollers mounted below and supporting said channel sections whereby the conveyor frame is movably mounted within the said frame, [and] an endless conveyor belt on the said conveyor frame, and a motor mounted adjacent one end of the said conveyor frame for driving said endless belt.

5. Concrete mix handling apparatus comprising in combination a movable base stand, a frame having top and bottom members and side members connecting the top and bottom members, said frame rotatably mounted upon the said base, pivotally supported arms mounted intermediately of their ends on the side members of the said frame, rollers adjacent each of the ends of the said arms, a conveyor frame, an inverted channel section on each side of the conveyor frame extending the length thereof forming tracks for the said rollers, said rollers being in engagement with the underside of the top flanges on the channel sections whereby the said conveyor frame is supported by the rollers, [an endless conveyor belt on the said conveyor frame,] a power driven belt supporting roller at one end of the said frame, an idler belt supporting roller at the opposite end of the said frame, a flexible conveyor belt on the said [rollers] *power driven roller and the said idler roller,* and a motor mounted adjacent one end of the conveyor frame geared to said power driven belt roller.

6. Concrete mix handling apparatus comprising in combination a movable base stand, a frame having top and bottom members and side members connecting the top and bottom members rotatably mounted upon the said base, pivotally supported arms mounted centrally of their ends on the side members of the said frame, rollers at each of the ends of the said arms, a conveyor frame having inverted channel members suspended upon said rollers, a power driven belt supporting roller at one end of the said conveyor frame, an idler belt supporting idler at the opposite end of the said conveyor frame, an endless conveyor belt on the said conveyor frame, and a motor mounted at one end of the conveyor frame geared to the said power driven belt *supporting* roller.

7. Concrete mix handling apparatus comprising in combination a movable base stand, a support frame having top and bottom members and side members connecting the top and bottom members rotatably mounted upon the said base, pivotally supported arms mounted centrally of their ends on the side members of the said frame, rollers at each of the ends of the said arms, a conveyor frame supported by the said rollers movably mounted within the said support frame and removable therefrom in a longitudinal direction, an endless conveyor belt on the [said rollers] *said conveyor frame,* an arcuate shaped flexible boot fixedly secured to the discharge end of the conveyor frame, and open ended fixed ring-shaped member secured to the upper side of the said support frame centered over the said conveyor belt into which ring-*shaped member* the said boot extends, and a motor mounted upon one end of the said conveyor frame for driving said conveyor belt.

8. Concrete mix handling apparatus comprising in combination a movable base stand, a frame having top and bottom members and side members connecting the top and bottom members rotatably mounted upon the said base, pivotally supported arms mounted centrally of their ends on the side members of the said frame, rollers at each of the ends of the said arms, a conveyor frame supported by the said rollers movably mounted within the said frame and removable therefrom in a longitudinal direction, an endless conveyor belt on the said conveyor frame, an arcuate shaped flexible boot fixedly secured to the discharge end of the conveyor shaped to control flow of the mix as it is discharged from the conveyor, an open ended rotatable [ring-shaped member] *ring* which is slidably mounted in *a* mating channel [ring] *portion of a ring-shaped member* which is secured to the upper side of the said frame centered over said conveyor belt into which ring-*shaped member* the said boot extends, and a motor mounted upon one end of the said conveyor frame for driving said conveyor belt.

9. A method for conveying and discharging a concrete mix which comprises the steps of depositing a concrete mix comprising cement, aggregate and water upon a moving conveyor belt, conveying said concrete mix at a speed of at least about six hundred feet per minute, and impelling said concrete mix against a stationary baffle at the discharge end of the conveyor belt for preventing separation of the particles composing said concrete mix.

10. A method for conveying concrete mix by a plurality of conveyors which comprises the steps of depositing a concrete mix comprising cement, aggregate and water upon a moving conveyor belt, conveying said concrete mix at a speed of at least about six hundred feet per minute, impelling said concrete mix against a baffle at the discharge end of the conveyor belt for preventing separation of the particles composing said concrete mix, and depositing said concrete mix upon an adjacent conveyor.

11. A method of conveying concrete mix which comprises the steps of depositing a concrete mix comprising cement, an aggregate and water upon a moving conveyor belt, conveying said concrete mix at a speed of at least about six hundred feet per minute, and discharging the said concrete mix at a high velocity against a boot at the discharge end of the conveyor for preventing separation of the components of said concrete mix.

References Cited

UNITED STATES PATENTS 2,805,760 9/1957 Vonstroh ---------- 198—92

RICHARD E. AEGERTER, *Primary Examiner.*

UNITED STATES PATENT OFFICE
CERTIFICATE OF CORRECTION

Reissue No. 26,298 November 21, 1967

John F. Oury, deceased, by
Alice M. Oury, executor, et al.

It is hereby certified that error appears in the above numbered patent requiring correction and that the said Letters Patent should read as corrected below.

In the grant, line 3, after "Illinois," insert -- assignors to Oury Engineering Company, of Elmhurst, Illinois, a corporation of Delaware, --; lines 15 and 16, for "Alice M. Oury, as executor, her successors or assigns, and Robert F. Oury, his heirs" read -- Oury Engineering Company, its successors --; in the heading to the printed specification, lines 4 to 7, for "John F. Oury, deceased, late of Wheaton, Ill., by Alice M. Oury, executor, Wheaton, Ill. (Indian Knoll Road, Rte. 1, Box 135, West Chicago, Ill. 60185), and Robert F. Oury, Army Trail, Wayne, Ill. 60184" read -- John F. Oury, deceased, late of Wheaton, Ill., by Alice M. Oury, executor, Wheaton, Ill., and Robert F. Oury, Wayne, Ill., assignors to Oury Engineering Company, Elmhurst, Ill., a corporation of Delaware --; column 10, after line 44, insert the following references:

FOREIGN PATENTS

| | | |
|---|---|---|
| 522,950 | 7/1940 | Great Britain |
| 882,668 | 7/1953 | Germany |
| 882,673 | 7/1953 | Germany |
| 913,516 | 6/1954 | Germany |
| 537,940 | 5/1955 | Belgium |

Signed and sealed this 24th day of December 1968.

(SEAL)
Attest:

EDWARD M. FLETCHER, JR.
Attesting Officer

EDWARD J. BRENNER
Commissioner of Patents